US012661619B2

(12) United States Patent
Kellenberger et al.

(10) Patent No.: US 12,661,619 B2
(45) Date of Patent: Jun. 23, 2026

(54) SOLVENT-FREE PRODUCTION OF POROUS POLYMER STRUCTURES

(71) Applicant: NOVAMEM AG, Schlieren (CH)

(72) Inventors: Christoph Ruedi Kellenberger, Zürich (CH); Michael Loepfe, Zürich (CH)

(73) Assignee: NOVAMEM AG, Schlieren (CH)

( * ) Notice: Subject to any disclaimer, the term of this patent is extended or adjusted under 35 U.S.C. 154(b) by 818 days.

(21) Appl. No.: 17/795,586

(22) PCT Filed: Jan. 28, 2021

(86) PCT No.: PCT/EP2021/052013
§ 371 (c)(1),
(2) Date: Jul. 27, 2022

(87) PCT Pub. No.: WO2021/152029
PCT Pub. Date: Aug. 5, 2021

(65) Prior Publication Data
US 2022/0410075 A1     Dec. 29, 2022

(30) Foreign Application Priority Data

Jan. 31, 2020     (EP) ..................................... 20155004

(51) Int. Cl.
B01D 67/00      (2006.01)
B01D 71/26      (2006.01)
(Continued)

(52) U.S. Cl.
CPC ....... B01D 67/003 (2013.01); B01D 67/0006 (2013.01); B01D 67/0013 (2013.01);
(Continued)

(58) Field of Classification Search
None
See application file for complete search history.

(56) References Cited

U.S. PATENT DOCUMENTS 3,062,760 A     11/1962   Dermody et al.
4,247,498 A      1/1981   Castro
(Continued)

FOREIGN PATENT DOCUMENTS

EP          0 477 689 A1     4/1992
EP          2 178 873 B1    12/2010
(Continued)

OTHER PUBLICATIONS

International Search Report Corresponding to PCT/EP2021/052013 mailed Apr. 9, 2021.
(Continued)

*Primary Examiner* — Virak Nguon
(74) *Attorney, Agent, or Firm* — Secant IP, P.L.L.C.

(57)          ABSTRACT

A method for manufacturing of porous polymer structures, in particular membranes, the method comprising the steps of providing a mixture of one or more polymers and one or more salt nano- and/or microparticles, primary shaping said blend, and removing said one or more salt particles, wherein at least part of the one or more salt nano- and/or microparticles is one or more solid acids, and whereby the ratio of polymer-to-particle is in the range of 3:1 to 1:10 by weight. Also provided are mixtures suitable to obtain such porous polymer structures, porous polymer structures as described herein, shaped articles containing such structures, and the use of such porous polymer structures, shaped articles and mixtures.

16 Claims, 5 Drawing Sheets

Figure 1:
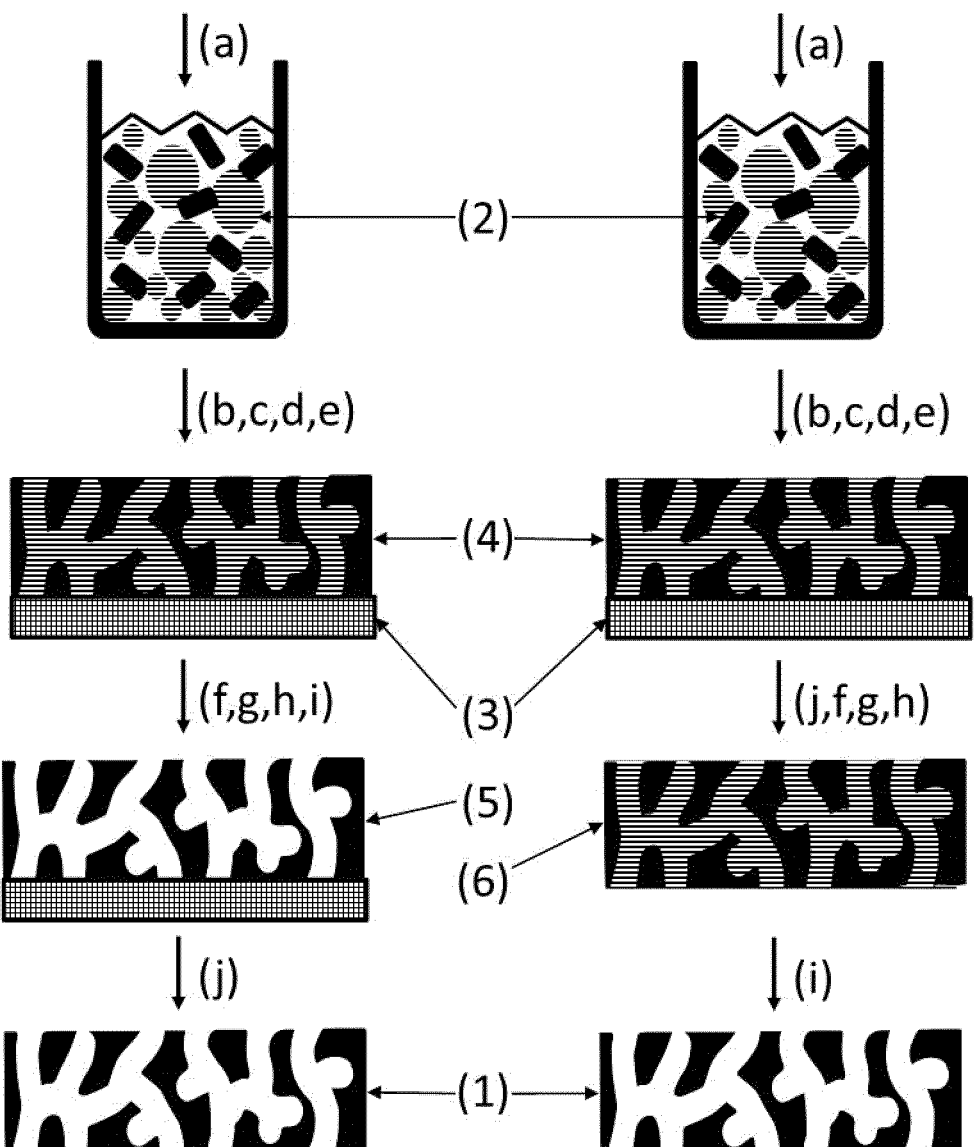

(51) Int. Cl.
    B01D 71/38          (2006.01)
    B29C 67/20         (2006.01)

(52) U.S. Cl.
    CPC ......... B01D 71/262 (2022.08); B01D 71/383
        (2022.08); B29C 67/202 (2013.01); *B01D*
        *2323/30* (2013.01)

(56)         References Cited

U.S. PATENT DOCUMENTS

| | | | |
|---|---|---|---|
| 4,885,092 A * | 12/1989 | Zwick ................... | B29C 67/202 |
| | | | 210/500.41 |
| 5,514,378 A | 5/1996 | Mikos et al. | |
| 8,944,257 B2 | 2/2015 | Eisen et al. | |
| 2013/0299417 A1* | 11/2013 | Luchinger .......... | B01D 67/0002 |
| | | | 524/424 |
| 2018/0371687 A1* | 12/2018 | Stark ......................... | C08J 5/18 |
| 2019/0022600 A1* | 1/2019 | Di Nicolo' ............. | B01D 71/34 |

FOREIGN PATENT DOCUMENTS

| | | | | |
|---|---|---|---|---|
| EP | 2665767 B1 * | 2/2016 | ......... | B01D 67/0002 |
| EP | 3 178 873 A1 | 6/2017 | | |
| JP | 2013209455 A * | 10/2013 | | |
| WO | 02/34819 A1 | 5/2002 | | |
| WO | 2012/097967 A1 | 7/2012 | | |

OTHER PUBLICATIONS

Written Opinion Corresponding to PCT/EP2021/052013 mailed Apr. 9, 2021.
Third Party Observation Corresponding to PCT/EP2021/052013 submitted Jan. 4, 2022.

* cited by examiner

SOLVENT-FREE PRODUCTION OF POROUS POLYMER STRUCTURES

The invention relates in a first aspect to a method of manufacturing porous polymer structures, in a second aspect to mixtures suitable for manufacturing such structures, in a third aspect to kits for manufacturing said mixtures, in a fourth aspect to novel porous polymer structures and to shaped articles comprising such structures, and in a fifth aspect to the use of such mixtures, structures and shaped articles.

Porous polymer membranes are used in a variety of separation processes, e.g. fluid filtration. Methods for manufacturing such porous polymer membranes must fulfill a variety of objects, such as (i) fluid throughput, i.e. how to achieve a high porosity in order to allow for high fluid throughput, (ii) retention, i.e. how to afford separation of particulate matter in the filtered fluid while maintaining high fluid throughput, and (iii) process, i.e. how to manufacture such porous polymer membranes at a large-scale and in a cost-efficient matter. With regard to the latter, environmental and sustainability considerations become increasingly important.

Today, most membranes are obtained by a phase separation process or by a template-based process. For example, U.S. Pat. No. 4,247,498 discloses the preparation of microporous polymer products having a homogeneous, three-dimensional cellular structure which comprises heating a thermoplastic polymer with an appropriate compatible liquid to form a homogeneous solution, cooling the resulting solution to initiate liquid-liquid phase separation, and subsequently continuing said cooling to solidify the polymer, and to remove the liquid to form a microporous material. Template based membrane manufacturing approaches comprising polymers, solvents and salt templates are also already known in the art, for example from the disclosures in U.S. Pat. Nos. 5,514,378, 8,944,257, WO 2012/097967, EP 2,178,873 and EP 2,665,767.

From U.S. Pat. No. 3,062,760 a process for the preparation of porous polymer structures is known, which uses monomers as the only raw material or else as solvents for their corresponding polymers. The pore-forming agents are dispersed in the monomer or monomer-polymer mixture. Polymerization is initiated to form a formable mass, which is further polymerized after forming into a definite shape in a subsequent step. Finally, the pore-forming agent is dissolved out using an aqueous solution.

However, the foregoing prior art techniques are not environmentally friendly because they use solvent, monomers, co-solvent and/or anti-solvent systems to fabricate said membranes. The recycling of said solvents can be challenging and does require detailed knowledge. Further, todays polymer membrane manufacturing requires a substantial amount of water that is directly associated to its process (i.e. coagulation bath of a phase inversion process) or for membrane post-treatment. This causes additional waste since solvent-based membrane manufacturing processes contaminate its processing water streams, as residual organic solvent from precedent process steps will fully or partially dissolve in said aqueous phase.

A method for the preparation of porous polymer membranes which does not use organic solvents is known from WO 02/34819, in which a polymers and granular inorganic ingredients are heat-mixed and molded in a film form, followed by immersing the film mold in acidic or alkaline solution to dissolve out and thus remove the granular inorganic ingredients. Said method is intended for the preparation of polymer membranes having water-proof and gas permeable properties, directly layered on a film or fiber.

EP 0 477 689 discloses a process for the preparation of porous polysulfone media suitable for use in filtration. Polysulfone is blended with a particulate solid or with particulate solids and a water-soluble second polymer, the blend is formed into a desired shape and soaked in a solvent in which polysulfone is insoluble to leach the soluble polymer and particulate solid from the filter, thereby leaving pores.

However, the aforementioned processes are not suitable for the manufacture of relatively thick, porous polymer structures with high porosity as template dissolution becomes increasingly difficult with increasing membrane thickness due to diffusion limitation of the solvent used for template removal. Complete dissolution is particularly difficult to achieve or time-consuming when polymers are used as pore-forming template. Removal of the template is additionally hampered by the fact that the pores at or near the surfaces of such extrudates are not readily accessible for the solvent due to skin formation, i.e. a rather closed pore structure, which stems from calibration. Calibration is typically performed by a unit downstream of the extruder for fixing the extruded material to the desired product dimensions. As a consequence, the resulting porous polymer membranes feature a decreased throughput.

Thus, it is an object of the present invention to overcome these and other disadvantages of the prior art and in particular to provide an improved method of manufacturing porous polymer structures that is not based on the use of any organic solvent and which is reliable, cost-effective, fast and compatible with existing manufacturing processes in industry. It is a further aim to provide porous polymer structures, in particular membranes, which are suitable for advanced applications, such as in breathable textile materials or filters for liquid and/or air purification.

These objects are achieved by a method of manufacturing a porous polymer structure, a mixture for manufacturing said structure, a kit for providing said mixture, a porous polymer membrane, a shaped article, and the use of a mixture or a kit in a method of manufacturing a porous polymer structure pursuant to the independent claims. Preferred embodiments are disclosed in the specification and the dependent claims.

The present invention will be described in more detail below. It is understood that the various embodiments, preferences and ranges as provided/disclosed in this specification may be combined at will. It is further understood that all references identified herein are incorporated by reference in its entirety.

According to the first aspect of the present invention, the method of manufacturing a porous polymer structure, in particular a membrane, having a pore size of 1 to 5000 nm, preferably 2 to 1000 nm, most preferably 5 to 400 nm, comprises the steps of (a) providing a mixture comprising 1 to 90 wt. % of one or more polymers and/or oligomeric precursors thereof, 0.5 to 95 wt. % of one or more salt nano- and/or microparticles, 0 to 70 wt. % of one or more fillers and 0 to 40 wt. % of one or more additives, wherein at least part of the one or more salt nano- and/or microparticles, preferably 1 to 100 wt. % of the one or more salt nano- and/or microparticles, more preferably 40 to 85 wt. % of the one or more salt nano- and/or microparticles, is one or more solid acids, and wherein the polymer-to-particles-ratio is in the range of 3:1 to 1:10 by weight; (b) optionally adapting the moisture content of said mixture; (c) optionally homogenizing said mixture to form a blend; (d) primary shaping said blend; (e) optionally coating a substrate with said blend; (f) optionally subjecting the obtained material to a drying and/or cooling step; (g) optionally subjecting the thus obtained material to further reshaping and/or processing; (h) optionally subjecting the thus obtained material to a polymerisation or cross-linking step; (i) removing said one or more salt particles with a nonorganic solvent, preferably removing said one or more salt particles by dissolving said salt particles in a non-organic solvent; (j) optionally removing the obtained porous polymer structure from said substrate.

It was surprisingly found that, by replacing at least part of the one or more salt nano- and/or microparticles with one or more solid acids, the removal of the template can be significantly accelerated. This allows thicker, porous polymer structures to be produced at a given production speed while maintaining favorable throughput and retention properties of the resulting membranes. It is of course conceivable and according to the invention that the entire amount of nano- and/or microparticles used is replaced by one or more solid acids. Also, it was surprising that the use of particulate salt provides an improved process which, on the one hand, provides suitable pores in the structure and on the other hand, provides an improved manufacturing rate. This is unexpected as the skilled person would expect salt nano- and/or microparticles to be individually coated by molten polymer and thus be protected from template dissolution.

While the prior art uses as a starting material a combination of a polymer, organic solvent(s) and/or salt nano- and/or microparticles, the present invention uses as a starting material only polymer(s) and salt nano- and/or microparticles, i.e. including the one or more solid acids, without the use of any organic solvent. This is considered advantageous as the environmental burden of solvent driven processes has grown and their use, especially for solvents falling under the substances of very high concern (SVHC) (e.g. N,N-Dimethylacetamide, Dimethylformamide, N-Methyl-2-pyrrolidone amongst others), will be more and more restricted.

It is also believed that the described process is considered advantageous regarding the use of process water since contamination of water with organic solvents is not a factor due to the lack of organic solvent in the manufacturing processes described herein.

The method of manufacturing described hereinafter provides porous materials in virtually unlimited size. As the manufacturing steps (a) to (j) do not provide a limitation regarding the size of the material (except for the equipment used) large sheet materials, in terms of length and width and thickness, are obtainable. For example, the invention also provides a method as disclosed herein, wherein the porous polymer structure has an area of more than 100 cm$^2$, preferably more than 400 cm$^2$.

Also, said manufacturing processes are considered advantageous, as the individual steps are already known and used in industry. Further, the process described herein may be implemented in a continuous process, which has a beneficial effect on the speed of the entire production process as well as on efficiency and production costs.

Unless otherwise stated, the following definitions apply in this specification:

The "porosity" of a material as described herein is the volumetric percentage (vol. %) of pores of the total material. Porosity can be determined by porosimetry, by measuring the apparent material density, BET analysis or from microscope images. In case of discrepancy between the values obtained by different methods, the values obtained by porosimetry according to ISO 15901-2 apply. With regard to the invention described herein, the pore structure is essentially an open pore structure.

The "permeability" of a material as described herein is defined as the flux of a fluid (i.e. a liquid medium or a gaseous medium) through interconnected pores of the material. Permeability can be determined by measuring the liquid or gas volume which passes a defined area of a porous structure in a defined time at an applied pressure. A typical measure of this flux is millilitre per square centimetre, per bar and minute (ml/cm$^2$*bar*min).

The term "nano- and microparticles" as used herein includes crystalline, semi-crystalline or amorphous materials. Such particles have a diameter in the submicron size range to the micron range. Primary particle sizes are preferably between 1 to 50000 nm. Suitable methods for the determination of primary particle size can be found by Limbach et al. (Environmental Science & Technology, 2005. 39(23): p. 9370-9376). Salt nano- and microparticles may be obtained from a range of preparation methods, including high temperature-gas phase processes (such as flame synthesis, laser processes and plasma processes), and liquid phase chemical methods (such as precipitation and sol-gel processes).

The term "solid acid" as used herein refers to a compound which is solid at the temperature used for the primary shaping of the mixture comprising polymer and particles, and which causes a decrease in pH when added to distilled water. The solid acids, which can be used according to the invention, essentially do not react under the conditions during primary shaping of the mixture comprising one or more polymers and one or more salt nano- and/or microparticles in the absence of water. In particular, the solid acids used have a melting point of more than 50° C., preferably of more than 110° C., most preferably of more than 170° C.

The term "primary shaping" ("Urformen" in german) as used herein refers to the manufacturing of a solid body from a shapeless material by creating cohesion (DIN 8580). A shapeless material is any starting material whose shape is not defined, such as powders, fibres, chips, granules, solutions, melts, and the like. Primary shaping of polymers may be divided into two groups with regard to the form of the products and their further processing, i.e. products produced by primary shaping which will be further processed by forming, severing, cutting, joining and products produced by primary shaping which essentially have the form and dimensions of finished components or end-products. In the latter case, the shape of such products essentially corresponds to the purpose of the product.

The "specific surface area" of a material as described herein is the total air-polymer interface area per amount of polymer mass. This surface area may be determined by physical adsorption of gas molecules, e.g. nitrogen molecules, using the BET method (according to: Janssen et al, Journal of Applied Polymer Science 52, 1913, 1994). The basic principle of the measurement is that a material with a high surface area can adsorb more molecular nitrogen on its surface (assuming a molecular monolayer).

The "washing solvent" as described herein is a non-organic solvent (e.g. water) that is used to remove the salt particles from the polymer matrix by dissolution in said non-organic solvent. The washing solvent is characterized as such that it does not dissolve polymer(s) used in the manufacturing process described herein. Further, the washing solvent is used in the method described herein preferably but not necessarily in a liquid aggregate state.

The first aspect of the present invention shall be explained in further detail below, whereby the process steps are described first and suitable materials are described afterwards:

Step (a): A mixture of salt nano- and/or microparticles, polymer(s) and/or oligomeric precursors thereof and optionally additives and/or fillers is provided first. The polymer content is 1 to 90 wt. %, preferably 5 to 65 wt. %, most preferably 10 to 45 wt. %. The content of salt nano- and/or microparticles is 0.5 to 95 wt. %, preferably 20 to 90 wt. %, most preferably 40 to 85 wt. %. The filler content is 0 to 70 wt. %, preferably 0 to 40 wt. % and the content of additives is 0 to 40 wt. %. Preferably, no additives are added to the mixture. It was found particularly suitable to combine these starting materials in powder from. This way, thorough mixing can be achieved by vigorously stirring the components of the mixture. At least part of the one or more salt nano- and/or microparticles, preferably 1 to 100 wt. % of the one or more salt nano- and/or microparticles, more preferably 40 to 85 wt. % of the one or more salt nano- and/or microparticles, is one or more solid acids. The ratio of polymer:particles (wt. %) is in the range of 3:1 to 1:10, preferably 2:1 to 1:9. Such comparatively high amounts of salt nano- and/or microparticles ensure proper pore formation within the manufactured porous polymer structures. Without being bound to theory, it is believed that a lower amount will not provide interconnecting necks.

Step (b): The moisture content of the mixture is optionally adapted to account for the different hygroscopic behaviour of the different polymers. The term "adapting" as used herein means that the moisture content of the mixture is measured and adjusted to a target value.

Step (c): Optionally, the same mixture is further homogenized to obtain a homogeneous blend. This process step can be part of the subsequent step (d). Homogenization can be performed at elevated temperatures, i.e. above the glass transition temperature of the mixture and/or under inert conditions to avoid polymer degradation and deterioration of blend properties, respectively. Homogenization of the mixture brings the advantage, that the salt particles are evenly distributed throughout the polymer matrix and that, as a result, also the pores in the structures are evenly distributed.

Step (d): The blend of step (c) is primary shaped, i.e. the blend comprising a mixture of salt nano- and/or microparticles, i.e. including the one or more solid acids, and polymer(s) in shapeless condition is given an initial form. It is understood that the homogenization step (c) and primary shaping step (d) can coincide or take place in one combined step, respectively.

Step (e): Optionally, the blend can be applied onto a substrate by suitable coating methods known in the field, such as extrusion, dip coating or casting amongst others. This results in a substrate-supported coating comprising a percolating network of salt particles, i.e. including the one or more solid acids, in a polymer matrix (i.e. a bi-continuous structured network of a polymer and a salt). The coating of a substrate has the advantage that said substrate may act as a supporting material and determine the preliminary or final shape of the porous polymer structure to be formed.

Step (f): Afterwards, the coated material may be subjected to a drying or cooling step. In this way, dimensional stability of physically setting or thermoplastic materials can be achieved.

Step (g): Also, the obtained material from step (e) may be subjected to further reshaping and or processing steps. These steps are intended to adapt the material thickness and/or to join said material to a further composite. Suitable methods are known in the field and include lamination methods, pleating methods or post-calendering.

Step (h): The coated material of step (e) may be subjected to a polymerisation and/or cross-linking step. This step is optional and may be applied when appropriate starting materials are used, particularly oligomers and/or monomers that may be polymerised, optionally in the presences of an initiator (polymerisation), or in case the polymer comprises groups that may be crosslinked, optionally in the presence of a cross-linking agent (crosslinking step).

Step (i): The continuous salt phase, i.e. including the one or more solid acids, in such composites is dissolved, which results in a porous polymer structure on a substrate. Suitable are particularly aqueous solvents, such as water or acidic aqueous solutions. The choice of washing solvent particularly depends on the type of salt used. The washing solvent in step (i) is selected to ensure dissolution of the salt nano- and/or microparticles without dissolving the polymer.

Step (j): The substrate may optionally be removed from the porous material, e.g. by peeling off, to obtain a free-standing porous polymer structure or transferred to another substrate. This removal step may take place after the washing step (i) or prior to the washing step (i) (as outlined further below). Step (j) may be performed using processes known per se. The removal step (j), aims to remove substrate to obtain an unsupported porous material or to transfer the porous material to another supporting material to obtain a coated article.

In an alternative embodiment, the invention provides a method as described herein, wherein said step (j) is performed prior to any step (f) to (i), as illustrated in FIG. 1, right hand side.

For example, the invention also relates to a method of manufacturing a porous polymer structure comprising the steps of (a) providing a mixture of one or more solids, i.e. including the one or more solid acids, as described herein; (b) optionally adapting the moisture content of said mixture; (c) optionally homogenizing said mixture to form a blend; (d) primary shaping said blend; (e) optionally coating a substrate with said blend; (f) optionally subjecting the obtained material to a drying and/or cooling step; (g) optionally subjecting the thus obtained material to further reshaping and/or processing; (h) optionally subjecting the thus obtained material to a polymerisation or cross-linking step; (j) removing the obtained material from said substrate and (i) removing said one or more salt nano- and/or microparticles by a dissolution step thereby obtaining the porous polymer structure.

The manufacture of suitable salt nano- and/or microparticles is known in the field. In a broad sense, any salt nano- and/or microparticles may be used in the inventive mixture. Suitable salt nano- and/or microparticles may be selected from a broad range of known salts, particularly metal salts, and combinations thereof.

Preferably, the salt nano- and/or microparticles are selected from the group consisting of oxides, carbonates (including hydrogen carbonates), sulphates, halides, nitrates and phosphates, preferably carbonates or oxides. Examples include $CaCO_3$, $BaCO_3$, $SrCO_3$, $Na_2CO_3$, $K_2CO_3$, NaCl, ZnO, CaO.

Preferably, the one or more solid acids are selected from the group consisting of carboxylic acids, sulfonic acids, phosphonic acids, pyrophosphoric acid, amino acids, Lewis acids, and derivatives thereof.

Examples of solid acids which belong to the class of carboxylic acids or derivatives of carboxylic acids and which can be used particularly preferably in the invention described herein are oxalic acid, tartaric acid, citric acid, mandelic acid, ascorbic acid and/or ethylenediaminetetraacetic acid.

Examples of solid acids which belong to the class of sulfonic acids or derivatives of sulfonic acids and which can be used particularly preferably in the invention described herein are sulfamic acid and/or 2-aminoethanesulfonic acid.

Examples of solid acids which belong to the class of amino acids and which can be used particularly preferably in the invention described herein are cysteine and/or methionine.

Examples of solid acids which belong to the class of Lewis acids and which can be used particularly preferably in the invention described herein are boric acid, $AlCl_3$ and/or $FeCl_3$.

Further examples of solid acids which can be used particularly preferably in the invention described herein are acid-coated nano- and/or microparticles.

Preferably, between 1 and 100 wt. % of the one or more salt nano- and/or microparticles is replaced by one or more solid acids.

Particularly preferably, between 40 and 85 wt. % of the one or more salt nano- and/or microparticles is replaced by one or more solid acids.

Preferably, the salt nano- and/or microparticles have a particle size of 1 to 50000 nm, preferably 5 to 20000 nm, most preferably 10 to 10000 nm.

By suitable selection of salt nano- and/or microparticles (size and amount) and by the selection of process parameters (such as coating thickness, drying time), porosity and pore size distribution may be varied over a broad range.

Preferably, the salts are prepared prior to step (a) in a separate process. The invention thus also relates to a method as described herein, wherein the salt nano- and/or microparticles are not prepared in situ.

It was found advantageous to use pre-manufactured salt nano- and/or microparticles, while in situ formation of salt nano- and/or microparticles is less preferred.

Preferably, the salt nano- and/or microparticles are selected from the group consisting of carbonates (including hydrogen carbonates) and oxides and the manufacturing method is performed continuously. It was surprisingly found that a continuous manufacturing process of porous polymer structures can be realized when using such salts as starting material. This may be attributed to the particularly fast dissolution and complete removal of said salts in aqueous solutions, particularly in acidic solutions.

In a further embodiment, the washing step (i) is repeated.

This way, a complete removal of salt nano- and/or microparticles can be achieved, if necessary. Thus, step (i) also includes multiple washings and dryings. When using a multi-step protocol, either the same or different washing solvents may be used, for example a diluted aqueous acid first, followed by water.

Suitable polymers include polymers that are not soluble in the washing solvent identified above and may be selected from a broad range of known polymers, such as amorphous polymers, semicrystalline polymers, cross-linkable polymers, polymerizable oligomers, and combinations thereof.

Suitable polymers thus include polysulfones, polyethersulfones, polycarbonates, polystyrenes, polyacrylates, polysiloxanes, polyarylates, polyurethanes, halogenated polyolefins such as polyvinylidene fluoride (PVDF), polyethylenes, polyimides, polyamides, liquid crystal polymers, cellulose acetates and polyether ketones, such as polyetheretherketone (PEEK). The invention also includes the use of co-polymers, mixtures of polymers ("polymer blends") and chemically modified polymers thereof, e.g. polymers modified by sulfonation, amination and hydroxylation.

Preferably, the polymers used in the methods described herein are selected from the group consisting of polysulfones, polyethersulfones, polycarbonates, polystyrenes, polyacrylates, polysiloxanes, polyarylates, polyurethanes, polyesters, polyethers, polyimides, polyamides, halogenated polyolefins, cellulose acetates and liquid crystal polymers.

Optionally, said polymers are selected from the group consisting of oligomers that can be polymerized or polymers that can be cross-linked.

The use of oligomers affords a lower viscosity and can facilitate the coating of the substrate, particularly when the substrate features a complex shape or when complete coverage of the substrate is desired. Cross-linking can enhance the durability of the coating and/or the free-standing porous polymer structure after its removal from the substrate, respectively.

Suitable additives may be selected from a broad range of known additives and mixtures thereof and are known in the field. Particularly, additives may be selected from the group consisting of surfactants, polymerisation initiators, stabilizers, crosslinking agents, wetting agents.

Suitable fillers may be selected from a broad range of known additives and mixtures thereof and are known in the field. Particularly, fillers may be selected from the group consisting of glasses, fibres or minerals in order to affect tensile strength, toughness, heat resistance, colour, clarity and other properties. In contrast to salt nano- and/or microparticles, fillers will not be removed by the dissolution step (i) and stay within the porous polymer structure.

By adding fillers to polymer resins specific properties (e.g. mechanical properties) can be improved and costs can be decreased. Such improvements can consist of, but are not limited to, an increased tensile strength, toughness, conductivity or heat resistance.

Suitable substrates may be selected from a broad range of known substrates. The substrate may be any support compatible with the manufacturing process. It is further beneficial if the coating adheres to the substrate during manufacturing and can be removed after manufacturing.

Preferably, the support material is selected from the group consisting of polymers (preferably semi-crystalline or crystalline), rubbers, metals, ceramics and glasses. Alternatively, the support material is selected from the group consisting of films, woven or non-woven textiles. In each case, the support material can have a two-dimensional or a three-dimensional shape and can be coated or uncoated.

In a preferred embodiment, the primary shaping in step (d) is performed by extruding said mixture through a dye, preferably to form a continuous structure with a constant cross-section. This way, flat films, sheets, single tubes, multibore tubing or honey comb structures, amongst others, can be obtained.

The terms "sheet material" or "porous foils" indicate that the material has a length and width which is at least one magnitude larger (preferably two magnitudes larger) than the thickness of the material. Such films and sheets consist only of the porous polymeric material according to the invention.

In an alternative embodiment, the primary shaping in step (d) is performed by casting said mixture, preferably to form parts with shapes other than films and sheets. In particular, such parts can comprise multiple materials with different properties and/or non-uniform cross sections. Suitable casting methods are known in the field, such as injection moulding.

The term "non-uniform cross-section" indicates that the cross-sectional profile of the part varies in a direction transverse to said cross-section and/or that the cross-sectional thickness of the porous polymer structure itself varies in a direction transverse to said cross-section.

Preferably, one or more of steps (a) to (j), preferably all steps (a) to (j), are performed continuously.

The term "performed continuously" as used herein refers to a flow production method used to manufacture, produce, or process materials without interruption, i.e. the materials that are being processed are continuously in motion, undergoing chemical reactions or subject to mechanical or heat treatment. Continuous processing is contrasted with batch production.

Preferably, the coating step (e) is selected from the group consisting of spraying, roll-to-roll processes.

By adapting at least some steps of the methods disclosed herein to a continuous process, the manufacturing of the porous polymer structures can be designed to be fast and cost-effective.

It was found that the surfaces of the primary shaped mixtures feature a substantially closed structure, i.e. the sizes of the pores connecting the porous polymer structure's interior to its exterior are significantly smaller compared to the pore sizes found in the bulk material. This closed pore structure at the surface is due to the calibration of the mixture during primary shaping and/or due to the contact of the mixture with objects such as rollers used to transport the primary shaped material and concomitantly forms at the interface between the porous polymer structure and said calibration or transporting units.

Preferably, the method disclosed herein comprises an additional step (k) of exposing the inner bulk material of the primary shaped mixture. In this embodiment, step (k) is performed after step (d) and prior to any of step (e) to (i). Alternatively, step (k) is performed after any of step (d) to (h) and prior to step (i).

This exposure of the inner porous structure can be achieved, for example, by splitting an extruded sheet into two halves by adhesion to two cooled rollers moving against each other. The still warm and thus formable material inside the sheet is consequently torn open, as will be described in more detail later. The porous polymer structures thus obtained are characterized by the fact that one of their sides has a more open structure than the other, i.e. the membranes have an asymmetric longitudinal section with a rather closed pore structure on one side and a particularly open pore structure on the opposite side.

The present invention relates in a second aspect to intermediates, i.e. mixtures useful for manufacturing porous polymer structures according to the method disclosed herein. This aspect of the invention shall be explained in further detail below.

Suitable mixtures may be prepared from the above starting materials using known techniques.

In a preferred embodiment, a mixture for manufacturing porous polymer structures, particularly a mixture for use in a method as described herein, compromises 1 to 90 wt. % polymers, preferably 5 to 65 wt. %, most preferably 10 to 45 wt. %; 0.5 to 95 wt. % salt nano- and/or microparticles, preferably 20 to 90 wt. %, most preferably 40 to 85 wt. %, having primary particle sizes between 1 and 50000 nm, preferably 5 to 20000 nm, most preferably 10 to 10000 nm; 0 to 70 wt. % fillers, preferably 0 to 40 wt. %; and 0 to 40 wt. % additives as defined herein, wherein at least part of the one or more salt nano- and/or microparticles, preferably 1 to 100 wt. % of the one or more salt nano- and/or microparticles, more preferably 40 to 85 wt. % of the one or more salt nano- and/or microparticles, is one or more solid acids, and whereby the polymer-to-nanoparticle ratio is in the range of 3:1 to 1:10 (wt. %), preferably 2:1 to 1:9 (wt. %).

Preferably, the polymers are selected from the group consisting of polysulfones, polyethersulfones, polycarbonates, polystyrenes, polyacrylates, polysiloxanes, polyarylates, polyurethanes, polyesters, polyethers, polyimides, polyamides, halogenated polyolefins, cellulose acetates and liquid crystal polymers.

Preferably, the mixture comprises no additives.

According to the third aspect of the present invention, the invention relates to a kit for manufacturing the mixtures described herein. This aspect of the invention shall be explained in further detail below.

In certain embodiments, it was found that the polymer can react with other parts of the mixture. Such mixtures are nevertheless suitable for the inventive process. The invention thus relates to both a mixture as described herein and a kit of parts, wherein said kit of parts comprises at least two parts, wherein a first part comprises one or more types of salt nano- and/or microparticles, wherein at least part of the one or more salt nano- and/or microparticles, preferably 1 to 100 wt. % of the one or more salt nano- and/or microparticles, more preferably 40 to 85 wt. % of the one or more salt nano- and/or microparticles, is one or more solid acids, and a second part comprises one or more polymers.

Preferably, a kit of parts according to the invention disclosed herein comprises a first part comprising salt nano- and/or microparticles, wherein at least part of the one or more salt nano- and/or microparticles, preferably 1 to 100 wt. % of the one or more salt nano- and/or microparticles, more preferably 40 to 85 wt. % of the one or more salt nano- and/or microparticles, is one or more solid acids, additives and fillers as described herein and a second part comprising polymer, additives and fillers as described herein.

The present invention relates in a fourth aspect to novel porous polymer structures, in particular membranes, and to shaped articles comprising such porous polymer structures. This aspect of the invention shall be explained in further detail below.

In one embodiment, the invention relates to a porous polymer structure, in particular membranes, obtained by a method as disclosed herein.

In a preferred embodiment, a porous polymer structure according to the invention features a maximum wall thickness of 1000 μm, preferably 50 nm to 400 μm, in the case of structures having a constant cross section or a maximum wall thickness of 4000 μm, preferably 800 μm to 3100 μm, in the case of parts with a nonuniform cross section; and/or a porosity of 10 vol. % to 95 vol. %, preferably 20 vol. % to 90 vol. %; and/or a pore size of 1 nm to 5 μm, preferably 2 nm to 1 μm, most preferably 5 nm to 400 nm.

In a preferred embodiment, the inventive porous polymer structure has a porosity of 10 to 95%, preferably above 20 to 90%, a pore size of 1 nm to 5 μm, preferably 2 nm to 1 μm, most preferably 5 nm to 400 nm.

In a further embodiment, the invention relates to a porous polymer structure as described herein which is impermeable to biologic material, including bacteria, viruses, cells, and/or impermeable to inorganic material, including salt nano- and/or microparticles.

In a further embodiment, the invention relates to a porous polymer structure as described herein which is permeable to liquids (including water), gases (including air), and dissolved material (including metal ions and proteins). Typically, the cut-off of the inventive porous polymer structures is in the range of 5 to 400 nm. Typically, the flow of the inventive porous polymer structures is in the range of 0.01 to 200 ml/min/cm$^2$ at 1 bar, preferably 0.1 to 10 ml/min/cm$^2$ at 1 bar.

As outlined above, a wide variety of polymers can be used for the inventive porous polymer structures. This is considered advantageous, as the presently known porous polymer structures are limited in view of the materials suitable and/or the characteristics of its pores. Suitable polymers may be selected from the group of polymers soluble in organic solvents and include polyesters; polyethers, such as polyetherether ketone (PEEK); polysulfones (PSU); polyethersulfones (PES); polyphenylene sulfone (PPSU); polycarbonates (PC); polyacrylates, such as polymethyl-methacrylate (PMMA); polystyrenes (PS); polysiloxanes, such as polydimethyl siloxane (PDMS); polyimides (PI); polyamides (PA); polyethylenes (PE); halogenated polyolefins, such as polyvinylidene fluoride (PVDF); cellulose acetate (CA) and liquid crystal polymers.

As outlined above, the inventive material is porous and characterized by the size, type and amount of its pores. The size and type and amount of pores may be influenced by the starting materials, the ratio of salt nano- and/or microparticles to polymer as well as the manufacturing process.

The size of the pores of the inventive porous polymer structures (defined by the diameter of the salt nano- and/or microparticles) is in the nanoscale or microscale range, typically from 1 to 5000 nm, preferably 2 to 1000 nm, more preferably 5 to 400 nm. The size of the pores may be determined by microscopy. Further, the pore size distribution may be precisely adjusted based on the starting materials used.

Pore size for particles with a particle size between 0.01 µm and 5 µm is determined by fluorescence read out of fluorescently labelled polystyrene or silica microspheres according to the following measurement protocol, in which a test particle with a size of 0.5 µm is given as an example:

(i) Preparation of Challenge Solution:

Fluorescent particles, available from ThermoFisher (Fluo-Spheres™, 0.5 µm, red fluorescent (580/605), F8812) or Micromod Partikeltechnologie GmbH (Product code: 42-00-502 Sicastar®-greenF), are diluted with 0.01% by volume polyoxyethylene (20) sorbitan monooleate (Tween® 80) in deionized water to obtain a final particle concentration of 1:1000.

(ii) Beads Retention Testing

A specimen of the porous polymer structure to be analysed is mounted into a filter housing (effective filter area 6 to 20 cm$^2$) comprising a woven or nonwoven support structure (e.g. Novatexx 2413, Freudenberg) for supporting the specimen in the filter housing. The support must be such that mechanical stress onto the membrane is minimized and the membrane therefore does not stretch under pressure. A defined volume of challenge solution is poured into the thus obtained test cell. The challenge solution is passed through the specimen with an air-pressure of 1 to 6 bar such that inherent bubble point of the membrane is overcome and until the entire challenge solution volume is passed through the specimen. The permeate is discarded and the procedure (ii) is repeated. This time, the Permeate is collected in a clean plastic weighing pan for analysis.

(iii) Analysis

Deionized water, challenge solution and permeate (250 µL each) are pipetted into a well plate (e.g. 96 well plate). Fluorescent read out is performed with plate reader (e.g. Tecan), using the following protocol:

10 s orbital shake, followed by, top readout of the red fluorescent particles without lid; Ex./Em. 540(25)/620(20) nm; Gain calculated from well with "full" signal, 25 flashes, 20 µs integration time, 3×3 square filled read out with 1000 µm border, Top readout of the green fluorescent particles without lid; Ex./Em. 465(20)/510(20) nm; Gain calculated from well with "full" signal, 25 flashes, 20 µs integration time, 3×3 square filled read out with 1000 µm border.

Readout of water represents blank signal, readout of challenge solution represents full signal and readout of permeate represents sample signal.

Retention R is then calculated from the well as follows:

$$R = \left(1 - \frac{\text{sample} - \text{blank}}{\text{full} - \text{blank}}\right) * 100\%$$

If R is larger than 90%, the challenge particles are filtered and the porous polymer structure is said to have a pore size smaller than the challenge particle size (in this example it would be 0.5 µm).

(iv) Adaption of Dilution

If the fluorescent readout of the blank is equal or larger than 10% of the fluorescent readout of the full, dilution shall be reduced until blank is below 10% of full.

Pore size for particles with a particle size between 1 nm and 100 nm is determined by a dextran rejection test that has been implemented to determine the molecular weight cut-off (denoted as MWCO, for details see: G. Tkacik, S. Michaels, Nature Biotechnology. 9:941-946, 1991): A membrane capable of rejecting at least 90% of a macromolecule of 1000 kDa can be classified to have a MWCO of 1000 kDA. A 0.1 wt % mixture of different dextran standards (5 kDa, 25 kDa, 80 kDa, 150 kDa, 270 kDa, 410 kDa, 670 kDa, 1400 kDa) (Fluka, CH) was prepared in 0.1M sodium nitrate (denoted as NaNO$_3$) buffer solution. The individual standards were mixed in equal amounts. The mixture was filtered (direct flow) through the membrane using a high vacuum pump (Edwards Vacuum Ltd). The permeate and the mixture were compared using gel permeation chromatography.

Hence, for example, the MWCO of a membrane showing a minimal rejection of 95% for the 1400 kDa dextran standard molecules can be classified as 1400 kDa.

In case the two methods described herein for determining the pore size lead to different results, the results obtained by fluorescence read out are decisive.

The porosity, i.e. the volume of pores in relation to the volume of the structure in total, can be varied in a broad range. Inventive materials show porosity in the range of 10 to 95 vol. %, preferably 20 to 90 vol. %. The porosity may be determined by porosimetry.

The pores of the material may be arranged in a way that the material is permeable, partly permeable or impermeable. If essentially all pores of the material have dead ends, the material is impermeable. In the contrary, if essentially all pores of the material have open ends, the material is considered permeable. Consequently, if a fraction of the pores has dead ends, the material is considered partly permeable.

In an advantageous embodiment, the present invention provides porous polymer structures, wherein at least 90% of said pores are interconnected.

A wide variety of articles may be equipped or directly produced with the inventive porous polymer structures.

In one embodiment, the invention relates to a shaped article comprising a porous polymer structure as described herein.

In a further embodiment, the shaped article comprises a support and a coating, preferably a top coating, wherein said coating consists of a porous material as defined herein.

In a further embodiment the invention relates to an article obtainable or obtained by a method as described herein.

Preferably, said shaped article is selected from the group consisting of pleated or unpleated filters, woven or non-woven textiles (wherein said porous polymer structure is laminated on said textile) or moulded parts that can again form filter units.

Especially the direct moulding into a final element is considered inventive, as said process allows the reduction of further process steps (e.g. no mounting or gluing of the porous polymer structure into its shaped article). This is again beneficial for the overall efficiency of the process. Further, avoiding post-mounting or gluing steps also reduce the risk of defectively joined parts. Thus, the presented invention potentially increases part reliability.

The invention further provides a method of manufacturing a porous polymer structure as described herein comprising the step of subjecting a shaped article (containing substrate and coating) to a dissolution step (i) and optionally removing from the thus obtained shaped article said support (step j). The dissolution step (i), as outlined above, aims to remove all or essentially all salt particles from said article. The removal step (j), as outlined above, aims to remove the substrate to obtain an unsupported porous material or to transfer the porous material to another supporting material to obtain a coated article.

The present invention relates in a fifth aspect to uses or methods of use of the intermediates, porous polymer structures and shaped articles as described herein.

In one embodiment, the present invention relates to the use of a mixture as described herein or a kit of parts as described herein in a method of manufacturing an inventive porous polymer structure.

In an alternative embodiment, the present invention relates to the use of a porous polymer structure as described herein in a filter (e.g. pleated or unpleated) device or as part of a woven or non-woven textile. The inventive porous polymer structures prove to be useful in a number of applications, including filter materials and textile materials.

The inventive porous polymer structures are self-supporting ("free standing"). Therefore, they distinguish from known porous polymer structures of similar thickness and porosity on a support. However, the inventive material is suitable for coating an appropriate support. The possibility of manufacturing such porous polymer structures independent from a specific support makes it very versatile.

In yet another alternative embodiment, the inventive porous polymer structures are used in known microfiltration, ultrafiltration and/or nanofiltration methods. Microfiltration is used to separate particles of 100 to 1000 nm, such as bacteria. Ultrafiltration is used to separate particles of 10 to 100 nm, such as viruses, proteins and colloids. Nanofiltration is used to separate particles of 1 to 10 nm, such as salts, pesticides, sugars.

In general, the inventive shaped articles retain the beneficial properties of the porous polymer structures as defined herein and are thus suitable for all uses that are applicable to such porous polymer structures. This particularly includes the uses as disclosed herein, such as microfiltration, ultrafiltration, nanofiltration (e.g., sterile filtration or viral filtration or concentration of biological molecules such as proteins).

In a further embodiment, the present invention relates to the use of an article, as defined herein, in a filter and/or in a textile material.

The following further embodiments of the present invention are conceivable:

I. A method of manufacturing a porous polymer structure, in particular a membrane, having a pore size of 1 to 5000 nm, preferably 2 to 1000 nm, most preferably 5 to 400 nm, comprising the steps of
  a) providing a mixture comprising:
    1 to 90 wt. % of one or more polymers and/or oligomeric precursors thereof, preferably 5 to 65 wt. %, most preferably 10 to 45 wt. %,
    0.5 to 95 wt. % of one or more salt nano- and/or microparticles, preferably 20 to 90 wt. %, most preferably 40 to 85 wt. %, having primary particle sizes between 1 and 50000 nm, preferably 5 to 20000 nm, most preferably 10 to 10000 nm,
    0 to 70 wt. % of one or more fillers, preferably 0 to 40 wt. %,
    0 to 40 wt. % of one or more additives, preferably no additives,
wherein the ratio of polymer:particles is in the range of 3:1 to 1:10, preferably 2:1 to 1:9, by weight;
  b) optionally adapting the moisture content of said mixture;
  c) optionally homogenizing said mixture;
  d) primary shaping said mixture;
  e) optionally coating a substrate with said mixture;
  f) optionally subjecting the obtained material to a drying and/or cooling step;
  g) optionally subjecting the thus obtained material to further reshaping and/or further processing;
  h) optionally subjecting the thus obtained material to a polymerisation or cross-linking step;
  i) removing said one or more salt particles with a non-organic solvent, preferably removing said one or more salt particles by dissolving said salt particles in a non-organic solvent; and
  j) optionally removing the obtained porous polymer structure from said substrate.

II. The method according to embodiment I, wherein said step (j) is performed prior to any of step (f) to (i).

III. The method according to embodiment I or II, wherein the primary shaping in step (d) is performed by extruding said mixture through a dye, preferably to form porous polymer structures with a constant cross section.

IV. The method according to embodiment I or II, wherein the primary shaping in step (d) is performed by casting said mixture, preferably to form parts with a non-uniform cross section.

V. The method according to any of the preceding embodiments I to IV, wherein one or more of steps (a) to (j) are performed continuously.

VI. The method according to any of the preceding embodiments I to V, wherein said coating step (e) is selected from the group consisting of spraying, roll-to-roll processes.

VII. The method according to any of the preceding embodiments I to VI, wherein a) said nano- and/or microparticles are selected from the group consisting of oxides, carbonates, sulphates, halogenides, nitrates and phosphates, preferably carbonates and oxides, most preferably $CaCO_3$, $BaCO_3$, $SrCO_3$, $Na_2CO_3$, $K_2CO_3$, NaCl, ZnO and CaO; and/or b) said nano- and/or microparticles have a particle size of 1 to 50000 nm, preferably 5 to 20000 nm, most preferably 10 to 10000 nm.

VIII. The method according to any of the preceding embodiments I to VII, wherein said polymer(s) is/are selected from the group consisting of i) polysulfones, polyethersulfones, polycarbonates, polystyrenes, polyacrylates, polysiloxanes, polyarylates, polyurethanes, polyesters, polyethers, polyimides, polyamides, halogenated polyolefins, cellulose acetates and liquid crystal polymers; and/or ii) polymers that can be cross-linked.

IX. The method according to any of the preceding embodiments I to VIII, wherein a) said support material is made of or essentially comprises polymer(s), rubber(s), metal(s), ceramic(s) and glass(es); and/or b) wherein said support material is a film, a woven or non-woven textile; and/or c) wherein said support material has a two-dimensional or a three-dimensional shape.

X. A mixture for manufacturing porous polymer structures, particularly for performing a method according to any one of embodiments I to IX, characterized in that the mixture compromises 1 to 90 wt. % of one or more polymers, preferably 5 to 65 wt. %, most preferably 10 to 45 wt. %; and 0.5 to 95 wt. % salt nano- and/or microparticles, preferably 20 to 90 wt. %, most preferably 40 to 85 wt. %, having primary particle sizes between 1 and 50000 nm, preferably 5 to 20000 nm, most preferably 10 to 10000 nm; and 0 to 70 wt. % fillers, preferably 0 to 40 wt. %; and 0 to 40 wt. % additives, preferably no additives, whereby the ratio of polymer:nanoparticle is in the range of 3:1 to 1:10, preferably 2:1 to 1:9, by weight.

XI. A kit of parts for manufacturing a mixture according to embodiment X, wherein a first part comprises one or more types of salt nano- and/or microparticles and a second part comprises one or more polymers, preferably a first part comprises salt nano- and/or microparticles, additives, fillers and a second part comprises polymer, additives, fillers.

XII. A porous polymer structure, in particular a membrane, obtained by a method according to any one of embodiments I to IX.

XIII. A porous polymer structure according to embodiment XII, characterized in that it features in the case of porous polymer structures having a constant cross section a maximum wall thickness of 1000 μm, preferably 50 nm to 400 μm; or in the case of porous polymer structures having a non-uniform cross section a maximum wall thickness of 4000 μm, preferably 800 μm to 3100 μm;

and/or a porosity of 10 vol. % to 95 vol. %, preferably 20 vol. % to 90 vol. %; and/or a pore size of 1 nm to 5 μm, preferably 2 nm to 1 μm, most preferably 5 nm to 400 nm.

XIV. A shaped article comprising a porous polymer structure according to embodiment XII or XIII, particularly a shaped article comprising a porous polymer structure according to embodiment XII or XIII wherein said shaped article is selected from the group consisting of:

a) pleated or unpleated filters; or b) woven or non-woven textiles; or c) molded parts.

XV. Use of a mixture according to embodiment X or a kit of parts according to embodiment XI in a method of manufacturing a porous polymer structure, particularly in a method of manufacturing a porous polymer structure according to any of embodiments I to IX.

The present invention is further explained in more detail by means of figures. Unless stated otherwise, like reference numerals are used to refer to the same or similar elements.

Figure 2:
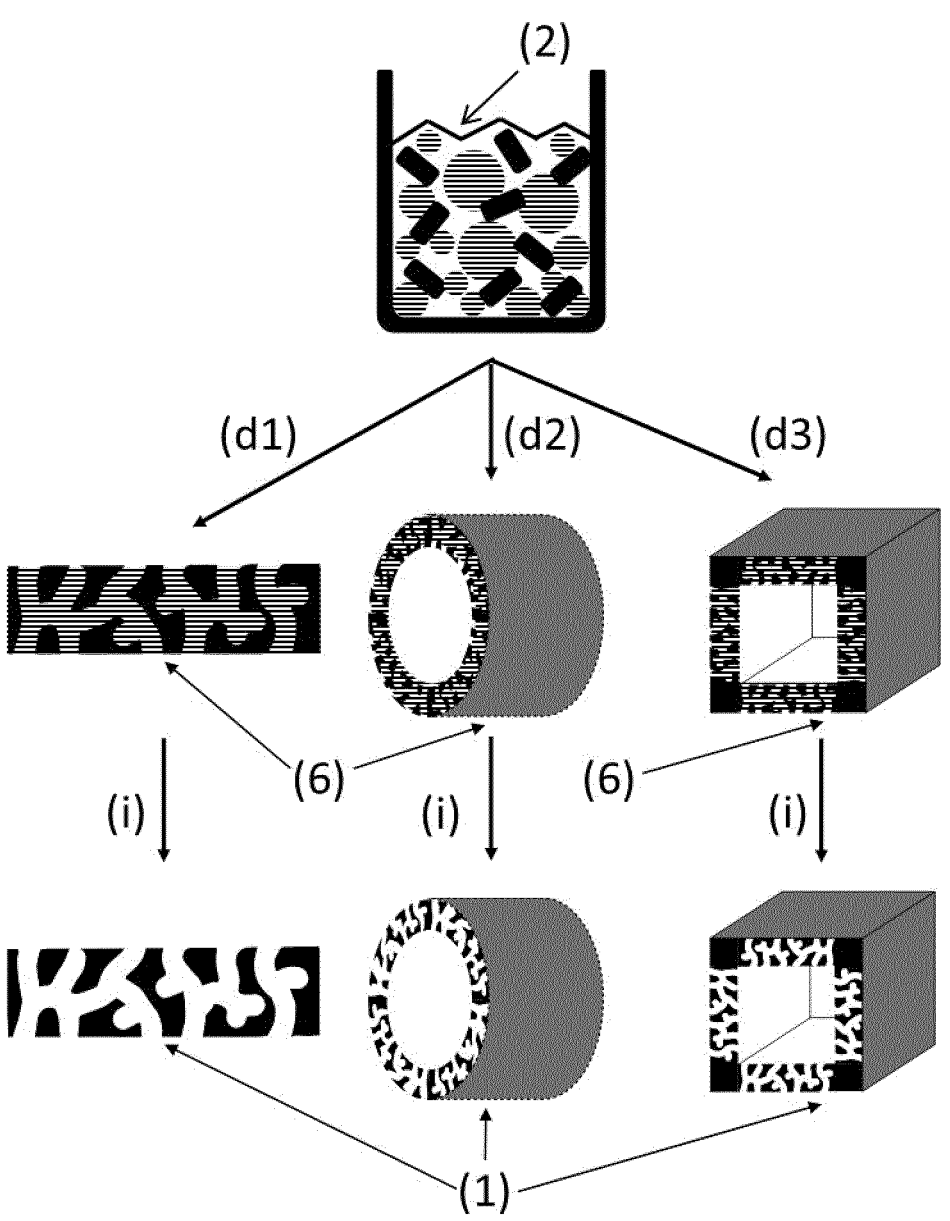
Figure 3:
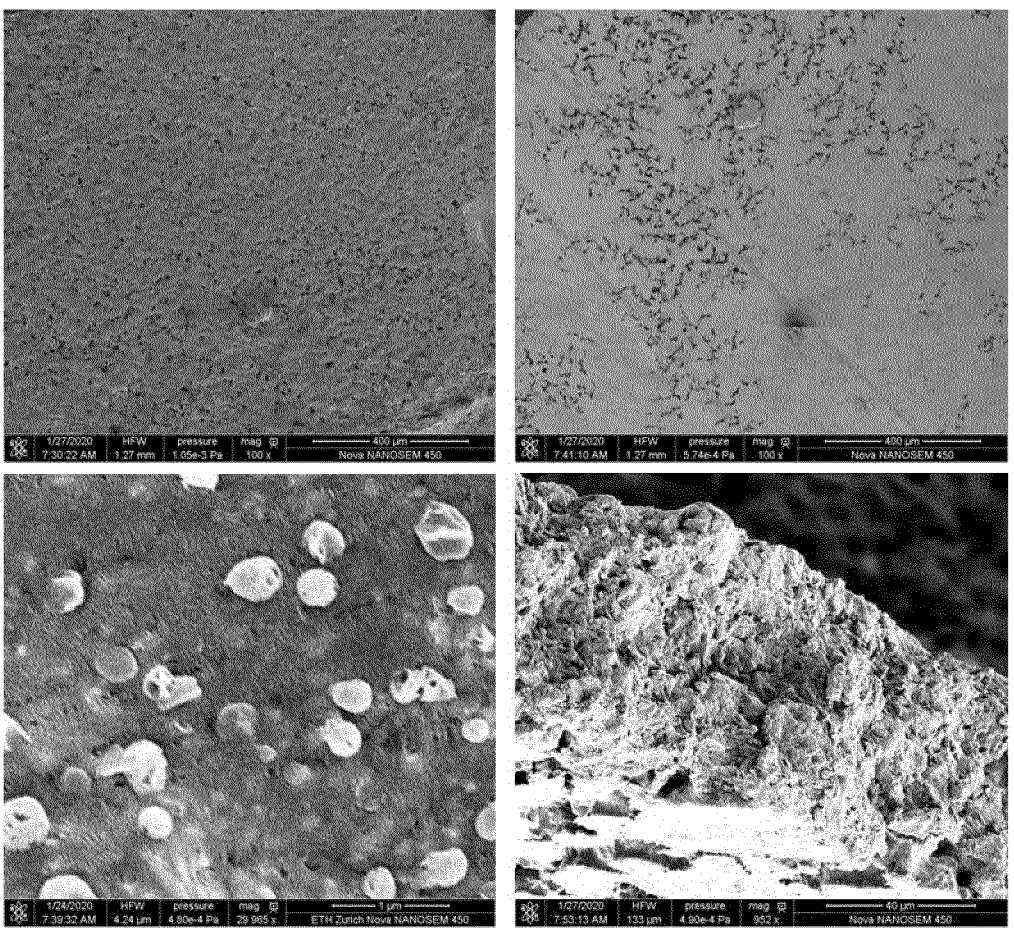
Figure 4:
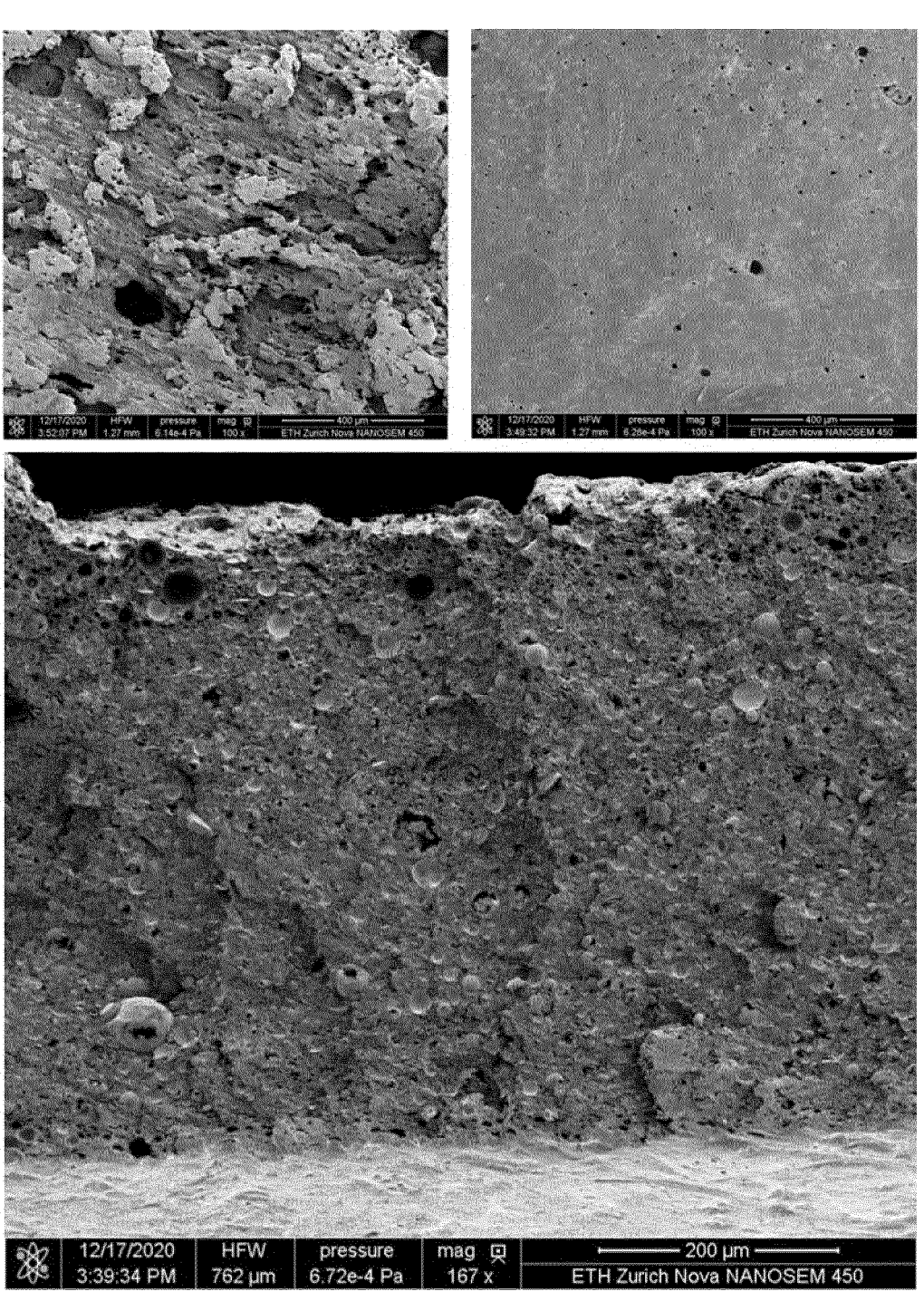
Figure 5A:
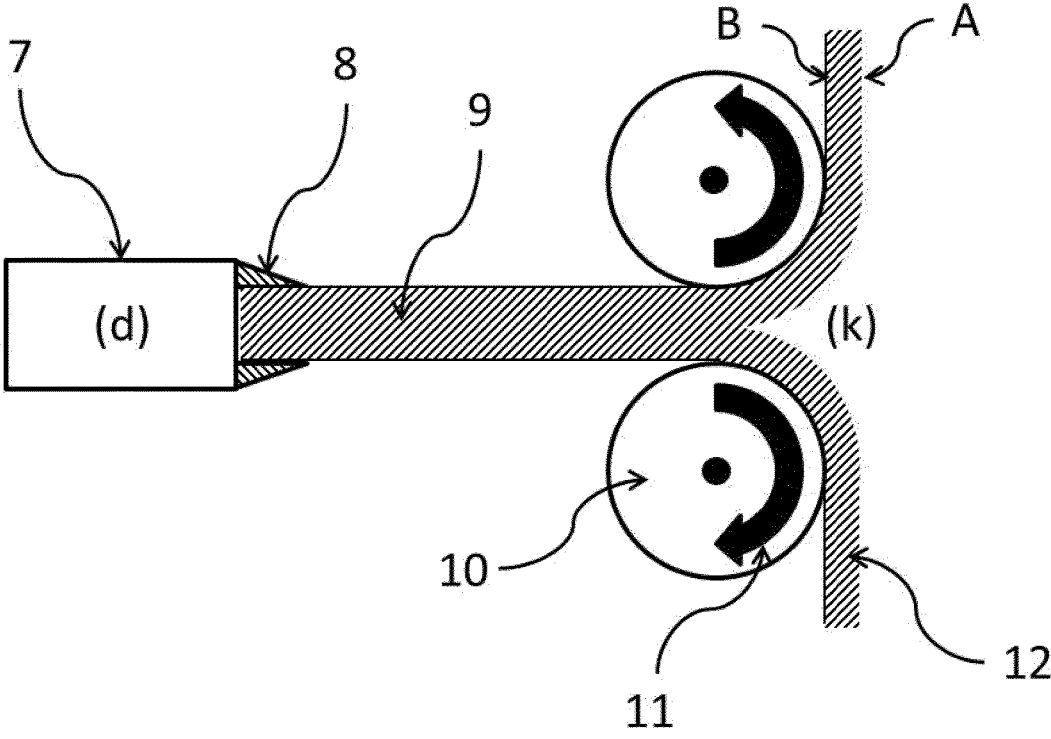
Figure 5B:
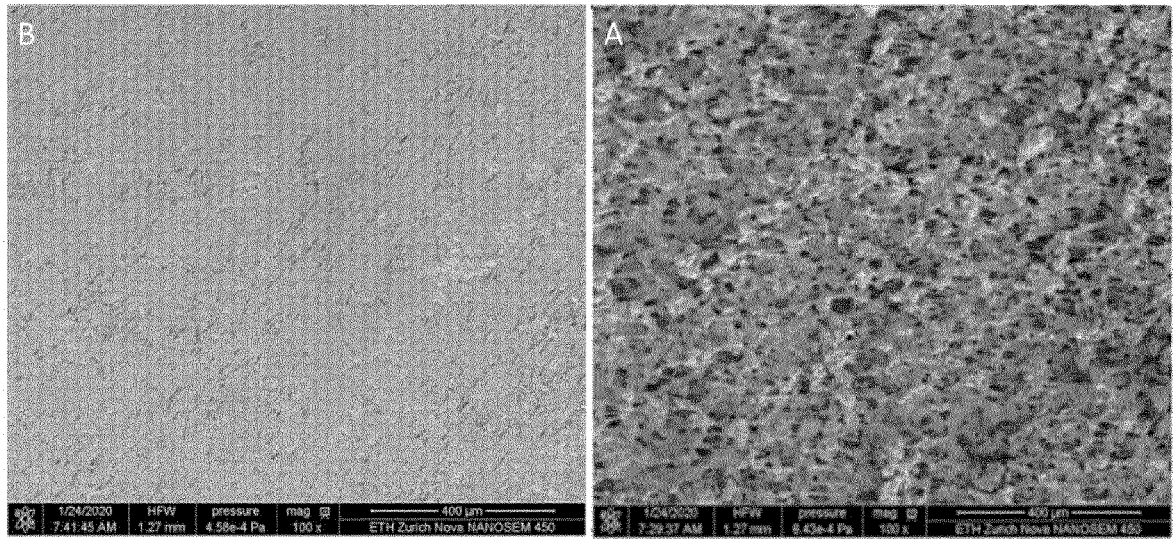

FIG. 1: Schematic view of methods of manufacturing porous polymer structures according to the invention;

FIG. 2: Schematic illustration of the variability in porous polymer structures obtainable by using different dyes;

FIG. 3: SEM images of a poly(propylene) membrane not according to the invention;

FIG. 4: SEM images of a poly(ethylene) membrane according to the invention;

FIG. 5a: Schematic illustration of a method as disclosed herein comprising a step of exposing the inner bulk material of the primary shaped mixture;

FIG. 5b: SEM images of a poly(propylene) membrane obtained by the method described in FIG. 5a.

One embodiment of the inventive method of manufacturing a porous polymer membrane 1 is illustrated in the left column in FIG. 1. In a first step (a), a mixture 2 is provided which contains salt nano- and/or microparticles, wherein at least part of the one or more salt nano- and/or microparticles is one or more solid acids, and a polymer. In a next step (b), the moisture content of mixture 2 is optionally adapted and the components are thoroughly mixed in step (c) to afford a homogeneous blend which is used to coat a substrate 3 in steps (d) and (e). The thus obtained bi-continuous structured network of a polymer and a salt 4 is optionally subjected to a drying and/or cooling step (f) and may be further reshaped and/or processed in step (g). Optionally, the coating 4 can be subjected to a polymerisation or cross-linking step (h). Finally, the nano- and/or microparticles are removed from the coating 4 by a washing solvent in step (i) to afford a substrate-supported porous material 5. The porous polymer film 5 is then removed from the supporting material 3 in step (j) to give membrane 1.

The right column in FIG. 1 illustrates an alternative embodiment of the inventive method of manufacturing a porous polymer membrane 1, wherein step (j), i.e. the separation of the salt/polymer composite film 4 from the substrate 3, is performed prior to steps (f) to (i). Thus, an unsupported, "free-standing" bi-continuous structured network of a polymer and a salt 5 is obtained first and dissolution of the salt particles in step (i) to afford the porous membrane 1 is performed afterwards.

FIG. 2 illustrates the variability of the primary shaping step (d) of the mixture 2 comprising polymer, salt nano- and/or microparticles, and at least one solid acid when using different primary shaping techniques. Dye processes (d1) and (d2) can be used to produce continuous structures with constant cross-sections, such as flat films or tubes, respectively. It may be desirable that the part comprises impermeable areas 6 and/or that the part is comprised of more than one material and/or that the part features a non-uniform cross-section. This circumstance is taken into account in FIG. 2 (d3) by the fact that the edges 6 of the exemplary shown hollow cuboid are represented differently from side faces of said cuboid. Such structures can for example be obtained by 2K injection moulding. FIG. 2 further illustrates that the porous structure 1 is then formed by dissolving the extruded or moulded parts in process step (i) to obtain said inventive porous membrane 1 in the form of flat films, tubes or parts comprising multiple materials with different properties.

To further illustrate the invention, the following examples are provided. These examples are provided with no intent to limit the scope of the invention.

I. Preparation of Starting Materials

The preparation of the salt nanoparticles is described in WO2005/087660. The synthesis of calcium carbonate (denoted as $CaCO_3$), barium carbonate (denoted as $BaCO_3$), strontium carbonate (denoted as $SrCO_3$), potassium carbonate (denoted as $K_2CO_3$) and sodium carbonate (denoted as $Na_2CO_3$) nanoparticles is shortly described below; an FSP apparatus as described in WO2005/087660 is used.

a) Preparation of $CaCO_3$ Nanoparticles:

Ca-2-Ethylhexanoate in 2-ethylhexanoic acid (Molekula) was diluted with tetrahydrofuran (THF) to a final calcium content of 3.9 wt. %. This precursor is fed (9 ml/min, HNP Mikrosysteme, micro annular gear pump mzr-2900) to a spray nozzle, dispersed by oxygen (9 l/min, PanGas Tech.) and ignited by a premixed methane-oxygen flame ($CH_4$, 1.2 l/min; $O_2$, 2.2 l/min). The off-gas is filtered through a glass fibre filter (Whatman Ltd., USA) by a vacuum pump (Busch S. A., Switzerland). The resulting powder is collected on the glass fiber filter and removed by a spatula.

b) Preparation of $BaCO_3$ Nanoparticles:

Ba-2-Ethylhexanoate in 2-ethylhexanoic acid (AlfaAesar) was diluted with tetrahydrofuran (THF) to a final barium content of 4.6 wt. %. The precursor is fed (5 ml/min, HNP Mikrosysteme, micro annular gear pump mzr-2900) to a spray nozzle, dispersed by oxygen (5 l/min, PanGas Tech.) and ignited by a premixed methane-oxygen flame ($CH_4$, 1.2 l/min; O2, 2.2 l/min). The off-gas is filtered through a glass fibre filter (Whatman Ltd., USA) by a vacuum pump (Busch S. A., Switzerland). The resulting powder is collected on the glass fibre filter and removed by a spatula.

c) Preparation of $SrCO_3$ nanoparticles: Sr-2-Ethylhexanoate in 2-ethylhexanoic acid (Strem Chemicals) was diluted with tetrahydrofuran (THF) to a final strontium content of 4.7 wt. %. The precursor is fed (5 ml/min, HNP Mikrosysteme, micro annular gear pump mzr-2900) to a spray nozzle, dispersed by oxygen (5 l/min, PanGas Tech.) and ignited by a premixed methane-oxygen flame ($CH_4$, 1.2 l/min; O2, 2.2 l/min). The off-gas is filtered through a glass fibre filter (Whatman Ltd., USA) by a vacuum pump (Busch S. A., Switzerland). The resulting powder is collected on the glass fibre filter and removed by a spatula.

d) Preparation of $K_2CO_3$ nanoparticles: 20 wt. % of K-2-Ethylhexanoate (AlfaAesar) was dissolved in 2-ethylhexanoic acid and further diluted with tetrahydrofuran (THF) to a final potassium content of 3.5 wt. %. The precursor is fed (5 ml/min, HNP Mikrosysteme, micro annular gear pump mzr-2900) to a spray nozzle, dispersed by oxygen (5 l/min, PanGas Tech.) and ignited by a premixed methane-oxygen flame ($CH_4$, 1.2 l/min; $O_2$, 2.2 l/min). The off-gas is filtered through a glass fibre filter (Whatman Ltd., USA) by a vacuum pump (Busch S. A., Switzerland). The resulting powder is collected on the glass fibre filter and removed by a spatula.

e) Preparation of $Na_2CO_3$ Nanoparticles:

20 wt. % of Na-2-Ethylhexanoate (Aldrich Fine Chemicals) was dissolved in 2-ethylhexanoic acid and further diluted with tetrahydrofuran (THF) to a final sodium content of 2.4 wt. %. The precursor is fed (5 ml/min, HNP Mikrosysteme, micro annular gear pump mzr-2900) to a spray nozzle, dispersed by oxygen (5 l/min, PanGas Tech.) and ignited by a premixed methane-oxygen flame ($CH_4$, 1.2 l/min; $O_2$, 2.2 l/min). The off-gas is filtered through a glass fibre filter (Whatman Ltd., USA) by a vacuum pump (Busch S. A., Switzerland). The resulting powder is collected on the glass fibre filter and removed by a spatula.

II. Preparation of Polymer Membranes a) Preparation of a Poly(Propylene) Membrane (not According to the Invention):

30 wt. % poly(propylene) resin (Aldrich Chemestry, USA) was heated in a ceramic beaker until the polymer was completely molten.

70 wt. % ZnO particles (Hongwu, China) were added under through stirring until a pasty molasses has formed. Said molasses was casted onto a hot metal plate using a metal roller to obtain a thin film. Said film has been left to cool off for 5 min. Finally, the salt particles are dissolved in 1M hydrochloric acid (denoted as HCl) for 10 minutes to reveal the porous structure.

The formation of porous structure has been confirmed by scanning electron microscopy (Nanosem 450, FEI). As can be seen in FIG. 3, dissolution of the ZnO particles in hydrochloric acid resulted in a porosity which is visible on both the upper side of the membrane (FIG. 3, top left) and the lower side facing the substrate (FIG. 3, top right). The apparent hole sizes are due to the size of the ZnO particles used (50 to 100 nm), whereby not completely dispersed particles, i.e. agglomerates, led to the formation of larger pores in the porous material. The membrane cross-sections shown in the lower line in FIG. 3 show residual ZnO particles in the poly(propylene) matrix (left side) and interconnected pores after repeating the dissolution step (right side).

b) Preparation of a Poly(Ethylene) Membrane According to the Invention:

33 wt. % polyethylene resin (CleanHDPE, Polytechs) was cycled in an extruder (HAAKE MiniLab) at 180° C., 60 rpm. 33 wt. % $CaCO_3$ particles (Solvay, USA) were gradually added to polymer, running in closed loop mode in the extruder. 33 wt. % sulfamic acid were gradually added to the composite, running in closed loop mode in the extruder. The final composite was extruded and pressed to form a flat film. This film was left to cool off for 5 min. Finally, the salt particles were dissolved in 1M hydrochloric acid (denoted as HCl) for 10 minutes to reveal the porous structure.

The formation of porous structure has been confirmed by scanning electron microscopy (Nanosem 450, FEI). As can be seen in FIG. 4, dissolution of the $CaCO_3$ particles in hydrochloric acid resulted in a porosity which is visible on both the upper side of the membrane (FIG. 4, top left) and the lower side facing the substrate (FIG. 4, top right). The apparent hole sizes correlate well with the size of the $CaCO_3$ particles used (500 to 1000 nm). The membrane cross-section shown in the lower line in FIG. 4 shows a network of interconnected pores which were obtained without repeated washing.

FIG. 5*a* shows a schematic illustration of a method as disclosed herein comprising a step (k) of exposing the inner bulk material of the primary shaped mixture. In this embodiment, primary shaping (d) of the mixture comprising polymer and particles by extrusion 7 and calibration 8 leads to a sandwich-like sheet 9 with solid upper and lower surfaces featuring relatively closed pores and at least partially molten polymer in its center. Such a membrane could also be considered symmetrical with respect to its longitudinal section. Two chilled rollers 10 with opposite direction of rotation, as indicated by arrow 11, are installed downstream of the extruder 7 to split the extruded sheet 9 into two parts 12, wherein the temperature of the chilled rollers 10 is set to at most half the temperature of the last zone at the exit of the extruder. Due to the cooled rollers 10, the material adheres to their surface and opens the still warm, "liquid" center of the extruded sheet 9. After cooling and removal of the salt particles with 1M hydrochloric acid, the two membranes 12 thus obtained each have an asymmetrical longitudinal section, with a pore structure that is rather closed on the respective roller side B and rather open on its opposite side A, as confirmed by the scanning electron microscopy images of the respective sides shown in FIG. 5*b*. The asymmetry of the longitudinal sections of the membranes 12 greatly facilitates and accelerates the complete removal of the salt particles in that the aqueous solvent can easily penetrate the material, especially from the open-pore A side, and produce the porous polymer structure.

The invention claimed is:

1. A method of manufacturing a porous polymer structure having a pore size of 1 to 5000 nm, comprising the steps of:
    a) providing a powder mixture comprising:
        1 to 90 wt. % of at least one of one or more polymers and oligomeric precursors thereof,
        0.5 to 95 wt. % of at least one of salt nanoparticles and salt microparticles having primary particle sizes between 1 and 50,000 nm,
wherein at least part of one or both of said at least one of salt nanoparticles and salt microparticles is one or more solid acids,
    and
wherein the ratio of polymer to particles is in the range of 3:1 to 1:10 by weight;
    d) primary shaping said mixture to obtain a material; and
        i) removing said at least one of salt nanoparticles and salt microparticles with a non-organic solvent to obtain a porous polymer structure.

2. The method according to claim 1, further comprising step
    f) subjecting the material to at least one of a drying step and a cooling step.

3. The method according to claim 1, further comprising step
    g) subjecting the material to at least one of further reshaping and further processing.

4. The method according to claim 1, further comprising step
    h) subjecting the material to a polymerization or cross-linking step.

5. The method according to claim 1, wherein the primary shaping in step (d) is performed by extruding said mixture through a die to form porous polymer structures with a constant cross section.

6. The method according to claim 1, wherein the primary shaping in step (d) is performed by casting said mixture to form parts with a non-uniform cross section.

7. The method according to claim 1, wherein one or more of the method steps are performed continuously.

8. The method according to claim 1, further comprising step
    e) coating a substrate with said mixture,
wherein said coating step (e) is selected from the group consisting of spraying and roll-to-roll processes.

9. The method according to claim 8, wherein
    a) said substrate is made of polymer(s), rubber(s), metal(s), ceramic(s) and glass(es); and/or
    b) wherein said substrate is a film, a woven or non-woven textile; and/or
    c) wherein said substrate has a two-dimensional or a three-dimensional shape.

10. The method according to claim 8, further comprising removing the obtained porous polymer structure from said substrate.

11. The method according to claim 1, wherein a) one or both of said nanoparticles and microparticles are selected from the group consisting of oxides, carbonates, sulphates, halogenides, nitrates and phosphates; and/or
    b) one or both of said at least one of salt nanoparticles and salt microparticles have a particle size of 1 to 50000 nm.

12. The method according to claim 1, wherein said solid acids is/are selected from the group consisting of at least one of
    i) carboxylic acids; and/or
    ii) sulfonic acids; and/or
    iii) phosphonic acids; and/or
    iv) pyrophosphoric acid; and/or
    v) amino acids; and/or
    vi) Lewis acids;
and derivatives thereof.

13. The method according to claim 1, wherein said at least one or more polymers is/are selected from the group consisting of at least one of
    polysulfones, polyethersulfones, polycarbonates, polystyrenes, polyacrylates, polysiloxanes, polyarylates, polyurethanes, polyesters, polyethers, polyimides, polyamides, halogenated polyolefins, cellulose acetates, liquid crystal polymers, and polymers that can be cross-linked.

14. The method according to claim 1, wherein the method comprises an additional step
    k) exposing an inner bulk material of the primary shaped mixture;
wherein step (k) is performed after step (d) and prior to step (i) and, if present, prior to any of a step e) coating a substrate with said mixture, a step f) subjecting the material to at least one of a drying step and a cooling step, a step g) subjecting the material to at least one of further reshaping and further processing, and a step h) subjecting the material to a polymerization or cross-linking step; or
wherein step (k) is performed after step (d) and, if present, after any of a step e) coating a substrate with said mixture, a step f) subjecting the material to at least one of a drying step and a cooling step, a step g) subjecting the material to at least one of further reshaping and further processing, and a step h) subjecting the material to a polymerization or cross-linking step, and prior to step (i).

15. A method of manufacturing a porous polymer structure having a pore size of 1 to 5000 nm, comprising the steps of:
    a) providing a powder mixture comprising:
        1 to 90 wt. % of at least one of one or more polymers and oligomeric precursors thereof,
        0.5 to 95 wt. % of at least one of salt nanoparticles and salt microparticles having primary particle sizes between 1 and 50,000 nm,
wherein at least part of one or both of said at least one of salt nanoparticles and salt microparticles is one or more solid acids,
    and
wherein the ratio of polymer to particles is in the range of 3:1 to 1:10 by weight;
    d) primary shaping said mixture to obtain a material,
        wherein the primary shaping is performed by extruding said mixture through a die to form porous polymer structures with a constant cross-section or the primary shaping is performed by casting said mixture to form parts with a non-uniform cross-section; and i) removing said at least one of salt nanoparticles and salt microparticles with a non-organic solvent to obtain a porous polymer structure.

16. A method of manufacturing a porous polymer structure having a pore size of 1 to 5000 nm, comprising the steps of:

a) providing a powder mixture comprising:

1 to 90 wt. % of at least one of one or more polymers and oligomeric precursors thereof, 0.5 to 95 wt. % of at least one of salt nanoparticles and salt microparticles having primary particle sizes between 1 and 50,000 nm, wherein 40 to 85 wt. % of said at least one of salt nanoparticles and salt microparticles is one or more solid acids, and wherein the ratio of polymer to particles is in the range of 3:1 to 1:10 by weight;

d) primary shaping said mixture to obtain a material; and i) removing said at least one of salt nanoparticles and salt microparticles with a non-organic solvent to obtain a porous polymer structure.

\*  \*  \*  \*  \*